United States Patent [19]

Jones

[11] Patent Number: 4,514,735

[45] Date of Patent: Apr. 30, 1985

[54] INK JET PRINTER START-UP AND SHUTDOWN

[75] Inventor: David E. Jones, Richardson, Tex.

[73] Assignee: The Mead Corporation, Dayton, Ohio

[21] Appl. No.: 522,954

[22] Filed: Aug. 12, 1983

[51] Int. Cl.[3] .............. G01D 15/18
[52] U.S. Cl. .............. 346/1.1; 346/75
[58] Field of Search .............. 346/75, 1.1

[56] References Cited

U.S. PATENT DOCUMENTS

| | | | |
|---|---|---|---|
| 3,656,174 | 4/1972 | Robertson | 346/75 |
| 4,081,804 | 3/1978 | Van Breemen et al. | 346/75 |
| 4,123,760 | 10/1978 | Hou | 346/75 |
| 4,160,982 | 7/1979 | Keur | 346/75 |
| 4,238,805 | 12/1980 | Paranjpe | 346/75 |
| 4,250,510 | 2/1981 | Dressler | 346/75 |
| 4,275,401 | 6/1981 | Burnett et al. | 346/75 |
| 4,286,272 | 8/1981 | Schwob | 346/75 |
| 4,413,265 | 11/1983 | Kockler et al. | 346/1.1 X |

OTHER PUBLICATIONS

IBM Technical Disclosure Bulletin, vol. 20, No. 1, Jun. 1977, pp. 33 and 34.

IBM Technical Disclosure Bulletin, vol. 19, No. 8, Jan. 1977, pp. 3216 and 3217.

*Primary Examiner*—E. A. Goldberg
*Assistant Examiner*—Gerald E. Preston
*Attorney, Agent, or Firm*—Biebel, French & Nauman

[57] ABSTRACT

An ink jet printer includes a print head for producing at least one jet drop stream from a fluid filament emerging therefrom, and charge electrode for inducing electrical charges on drops formed from the fluid filament. The charge electrode is movable into and out of an operating position in which it is adjacent and at least partially surrounds the fluid filament. A deflection field is established prior to start-up in which the field has a non-zero electrical potential in the region of the fluid filament. At start-up and shutdown of the printer, the charge electrode is retracted from its normal operating position and drops are charged by the deflection field. As a consequence, the charge electrodes are not contaminated by ink from the unstable jets. The drops in the jet drop streams are, however, charged and deflected to a catcher by the deflection field. After stable operation is obtained, the charge electrode is moved into its normal operating position. At shutdown of the printer, this sequence of steps is reversed.

14 Claims, 11 Drawing Figures

INK JET PRINTER START-UP AND SHUTDOWN

BACKGROUND OF THE INVENTION

The present invention relates to ink jet printing and, more particularly, to an ink jet printer in which printer operation and reliability at start-up and shutdown are enhanced.

Ink jet printers accomplish printing by depositing drops of ink on a print receiving medium in a pattern such that a print image is collectively formed by the drops. Typically, an ink jet printer includes a print head which defines a fluid reservoir to which electrically conductive ink is supplied. At least one orifice, defined by an orifice plate or similar structure, communicates with the fluid reservoir. It is common that an orifice plate will define a plurality of orifices which are arranged in one or more rows. Ink is forced under pressure through each orifice and emerges from the orifice as a fluid filiment. Pressure varicosities are generated in the fluid filament or filaments by mechanical stimulation of the orifice plate or by generating pressure waves which travel through the ink in the fluid reservoir. The fluid filaments are therefore caused to breakup into streams of ink drops of substantially uniform size and spacing.

Charge electrodes are positioned beneath the orifice plate, adjacent the tips of the fluid filaments. Electrical charge potentials, selectively applied to the charge electrodes, induce corresponding charges of opposite polarity on the drops as they are formed from the filament tips. The drops then pass downwardly through a deflection field, with the charged drops being deflected by the field and the uncharged drops passing through the field in non-deflected trajectories. The amount of deflection experienced by a drop is dependent upon a number of factors, including the level of charge carried by the drop, the strength of the deflection field, the mass of the drop, and the time required for the drop to traverse the field.

During the start-up process the pressure of the ink in the fluid reservoir is increased over a short but finite length of time. Until the pressure reaches the normal operating pressure for the print head, the fluid flow characteristics of the jet are unpredicatable and, additionally, the stimulation system may not be effective in producing breakup of the drops. As a consequence, the breakup timing, size of the drops formed, and initial trajectories of the drops will vary unpredictably.

There is, therefore, a possibility that large amounts of ink may be deposited upon the charge electrodes and upon the deflection field electrode structure of the printer during start-up. If this occurs, the electrically conductive ink tends to short out the charge electrodes and the deflection electrode structure, and may also interfere with the trajectories of the jets once stable operation is attained. Additionally, ink may be deposited on the print receiving medium transport and spoil subsequently printed copies carried by the transport.

Similar problems are encountered at shutdown of the printer. As the pressure of the ink in the fluid reservoir is reduced and fluid flow through the orifices is terminated, the jets once again become unstable and difficult to control.

Several different approaches have been taken to overcome the problems presented by jet instability at start-up and shutdown. As shown in Van Bremen et al, U.S. Pat. No. 4,081,804, a print head has been mounted over a drip pan at start-up to collect drops formed from the fluid filiments until after the jets become stable. A print receiving medium is then transported between the print head and the drip pan, and printing is initiated.

A notched charge electrode plate is shown in *IBM Technical Disclosure Bulletin,* Vol. 20, No. 1, June 1977, pages 33 and 34. The charge electrode plate may be pivoted into an operating position only after start-up is completed. During the start-up operation, the charge electrodes are removed from the region of drop formation, thereby reducing wetting of the charge electrodes. In an alternative arrangement, the charge electrode plate may be translated, rather than pivoted, into its operating position after start-up. While reducing fouling of the charge electrodes, these mechanisms are not without drawbacks. Pivoting the charge electrode plate requires a substantial clearance in the printer structure. The translational mechanism, on the other hand, is one in which the charge electrode plate is mounted on a spring arm and cammed out of its operating position. It will be appreciated that a spring mounting mechanism may be subject to undesirable vibration and, additionally, the position of the charge electrode plate may be subject to dimensional inaccuracies due to temperature variations.

*IBM Technical Disclosure Bulletin,* Vol. 19, No. 8, January 1977, pages 3216 and 3217, discloses an ink jet printer in which a pair of charge electrode plates are moved laterally into and out of operating positions after start-up and prior to shutdown, respectively. Additionally, a pair of catchers, positioned outwardly of the two parallel rows of jet drop streams during operation of the printer, are moved laterally together into contact at start-up and shutdown to prevent splattering of the ink on the print receiving medium.

Keur, U.S. Pat. No. 4,160,982 discloses an ink jet printing system having a catcher which is positioned in line with the non-deflected jet drop stream during printing and which is raised to abut directly the print head during start-up and shutdown. The charging and deflection electrodes are pivotally mounted such that they may be moved out of the way to permit this movement of the catcher.

In Paranjpe et al U.S. Pat. No. 4,238,805, an ink jet printing system is shown which includes a pair of catchers which are pivotally mounted to be movable into positions in which substantially all of the drops from a pair of rows of jet drop streams strike the catchers during start-up and shutdown. The mechanical linkage arrangement which pivots the catchers and, additionally, which translates charge electrode plates into and out of operating positions is, however, relatively complicated. It will be appreciated that it is desirable to limit movement of printer elements as much as possible in an ink jet printing system so as to enhance dependability of the system.

Schwob U.S. Pat. No. 4,286,272 shows the start-up arrangement in which the drops from the jet drop streams are initially deflected to a catcher structure so as to prevent printing at the time of start-up. The catcher structure is not moved between start-up and the ordinary printing operation. Deflection of the jet drop streams results from lateral fluid movement through the print head which imparts a lateral velocity component to the drops in the jet drop streams. This arrangment requires a relatively large fluid manifold inlet to the print head and outlet from the print head such that the lateral fluid flow velocity component can be imparted to all of the jet drop streams along the entire row of streams.

Accordingly, it is seen that there is a need for a simple, reliable, and compact ink jet printer in which start-up and shutdown of the printer are facilitated without the need for movable catchers and charge electrode assemblies.

SUMMARY OF THE INVENTION

An ink jet printer according to the present invention includes print head means for producing at least one jet drop stream from a fluid filament emerging therefrom, with the print head means being electrically grounded. A charge electrode means, when in a first position at least partially surrounding the filament, induces electrical charges on drops formed from the fluid filament. The charge electrode means is movable between its first position and a second position which is remote from the fluid filament. A catcher means is positioned to one side of the path of the jet drop stream for catching drops deflected thereto. A deflection field means produces an electrical deflection field in the region between the print head means and the catcher means. The field extends in a direction such that drops carrying a charge of a first polarity are deflected toward the catcher means. The field has a non-zero potential of a second polarity in the region of the fluid filament. A means is further provided for moving the charge electrode means from its second position to its first position after start-up of the printer and initiation of the jet drop stream, and for moving the charge electrode means from its first position to its second position prior to shutdown of the printer. By this arrangement, drops in the jet drop stream are charged by the deflection field and deflected to the catcher means at start-up and shutdown of the printer.

In a first embodiment of the printer of the present invention, the deflection field means comprises first and second deflection electrodes which are positioned symmetrically with respect to the jet drop stream, and means for applying an electrical potential of a first polarity to the first deflection electrode and for applying a second electrical potential of a second polarity to the second electrode. The absolute value of the electrical potential of a first polarity is less than the absolute value of the electrical potential of a second polarity. As a consequence, the field has a non-zero potential of a second polarity in the region of the fluid filament, and drops are charged by the field when the charge electrode means is positioned in the second position remote from the fluid filament.

The second deflection electrode may be positioned on the same side of the jet drop stream as the catcher means. The second deflection electrode may be formed of a porous material and define a vacuum cavity to which a partial vacuum is applied, whereby drops striking the second deflection electrode are ingested into the vacuum cavity.

In another embodiment, the deflection field means includes first and second deflection electrodes which are positioned on opposite sides of the jet drop stream, with the second deflection electrode being substantially closer to the jet drop stream than the first deflection electrode. A means is provided for applying first and second electrical potentials of first and second polarities to the first and second deflection electrodes, respectively. The first and second electrical potentials are of substantially equal magnitude such that the field has a non-zero potential of a second polarity in the region of the fluid filament and drops are charged by the field when the charge electrode means is in its second position, remote from the fluid filament.

In both embodiments the charge electrode means is retracted from its normal operating position during periods of jet instability such that the charge electrode means is not inadvertently wetted. Additionally, charging of the drops is accomplished using the deflection field, thereby permitting the catcher to catch substantially all of the drops produced at start-up and shutdown.

The print head means may produce a plurality of jet drop streams which are arranged in at least one row. The charge electrode means may include a charge plate defining a plurality of open sided charge electrodes along one edge of the plate. The method of printer start-up may include the steps of:

(a) retracting the charge electrode means from its normal operating position;
(b) producing an electrical deflection field having a non-zero potential of a second polarity in the region adjacent the print head;
(c) initiating jet drop stream formation, whereby the drops formed are electrically charged to a first polarity by the electrical deflection field and subsequently deflected to the catcher; and
(d) moving the charge electrode means into its normal operating position so as to shield the jet drop stream in the region of drop formation, while continuing to charge the drops to a first polarity with the charge electrode means so as to catch the drops.

The step (b) of producing an electrical deflection field may include the steps of:

providing first and second deflection electrodes positioned symmetrically to either side of the jet drop stream; and applying an electrical potential of the first polarity to the first electrode and an electrical potential of a second polarity to the second electrode. The electrical potential of a second polarity is selected such that it has an absolute magnitude greater than the absolute magnitude of the electrical potential of the first polarity. As a consequence, the potential of the field in the region where drops are formed is non-zero and is of the same polarity as the second polarity, thereby inducing a charge of a first polarity on the drops.

Alternatively, step (b) of producing an electrical deflection field may include:

providing first and second deflection electrodes positioned to either side of the jet drop stream, with the second deflection electrode being closer to the jet drop stream than the first electrode; and applying an electrical potential of a first polarity to the first deflection electrode and an electrical potential of a second polarity to the second deflection electrode. The potentials applied to the deflection electrodes are of substantially equal magnitude.

The step of moving the charge electrode means into its normal operating position may include the step of providing an electrical field potential of a second polarity in the region of drop formation with the charge electrode means so that drops continue to be charged to the first polarity and continue to be deflected to the catcher.

The method of printer shutdown includes the steps of:

(a) producing an electrical deflection field having a non-zero potential in the region adjacent the print head, while shielding the jet drop stream with the charge electrode means in the region of drop formation from the deflection field;

(b) charging drops formed in the jet drop stream to a charge level of the first polarity by the charge electrode means;

(c) retracting the charge electrode means from its normal operating position to expose the drops then being formed to the electrical deflection field, whereby the drops are charged to a charge of a first polarity by the electrical deflection field and therefore are deflected to the catcher; and (d) terminating jet drop stream formation.

The step (a) of producing an electrical field may include the steps of:

providing first and second deflection electrodes positioned symmetrically to either side of the jet drop stream; and applying an electrical potential of a first polarity to the first electrode and an electrical potential of a second polarity to the second electrode. The electrical potential of a second polarity has an absolute magnitude greater than the absolute magnitude of the electrical potential of the first polarity. As a consequence, the potential of the field in the region where the drops are formed is non-zero and is of a second polarity, thereby inducing a charge of a first polarity on the drops.

Alternatively, the step (a) of producing an electrical deflection field includes the steps of:

providing first and second deflection electrodes positioned to either side of the jet drop stream, with the second deflection electrode being closer to the jet drop stream than the first deflection electrode; and applying an electrical potential of a first polarity to the first deflection electrode and an electrical potential of a second polarity to the second deflection electrode, potentials applied to the deflection electrodes being of substantially equal magnitude.

The step (b) of charging drops by the charge electrode means includes the step of providing an electrical field potential of a second polarity in the region of drop formation.

Accordingly, it is an object of the present invention to provide an ink jet printer in which start-up and shutdown of the printer are facilitated; to provide such a printer and a method of starting up and shutting down the printer, in which the need for a movable catcher or deflection electrode is eliminated; to provide such a printer and method in which start-up and shutdown of the printer are accomplished without substantial ink contamination of charge electrodes or other elements; and to provide such a printer and method in which the arrangement for producing the deflection field also produces a non-zero electrical potential in the region where drops are formed by the printer so as to induce charges on the drops which result in the drops being deflected to a catcher during start-up.

Other objects and advantages of the invention will be apparent from the following description, the accompanying drawings and the appended claims.

DETAILED DESCRIPTION OF THE PREFERRED EMBODIMENTS

Figure 1A:
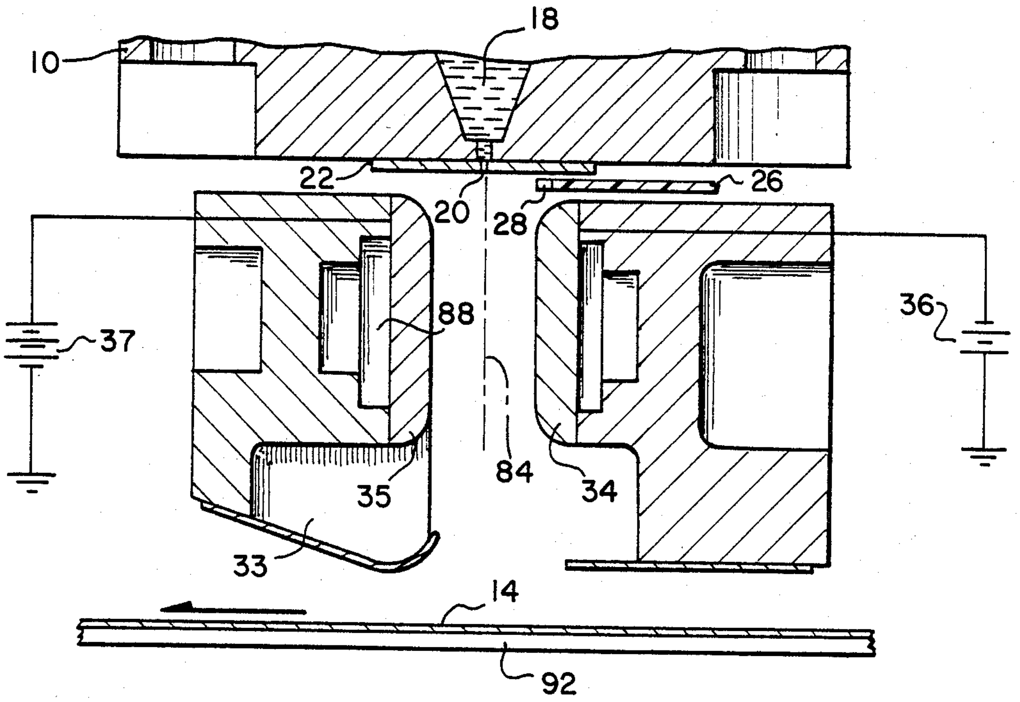
FIGS. 1a–1d are sectional views taken generally along line 2—2 in FIG. 3, illustrating start-up of a first embodiment of the printer constructed according the present invention.

Reference is made to FIG. 1a and FIGS. 3–5 which illustrate a first embodiment of the ink jet printer of the present invention. The printer includes a print head means 10 for producing at least one jet drop stream 12 from a fluid filament emerging therefrom. The print head means may advantageously provide a plurality of jet drop streams 12 which are arranged in at least one row and directed at a print receiving medium 14 which may for example be a sheet or a web of paper. Fluid filaments 16 (FIG. 1b) are formed by fluid which is applied to a fluid reservoir 18 under pressure and which emerges from the print head 10 through a plurality of orifices 20. Mechanical vibration is applied to the print head 10, the fluid in reservoir 18, or the relatively thin orifice plate 22 which defines the orifices 20, in a known fashion in order to produce breakup of the fluid filaments 16 into drops of substantially uniform size and spacing, and stable predictable trajectories.

The ink jet printer further includes charge electrode means 24, having a notched charge electrode plate 26 in which a plurality of charge electrodes 28 are defined by electrically conductive coatings within notches spaced along one edge of plate 26. The spacing between notches corresponds to the spacing between jet drop streams. The drop charging means permits selective electrical charging of drops in each of the jet drop streams 12 when electrical charging potentials are applied to the charge electrodes with the charge electrodes positioned partially surrounding corresponding fluid filaments as illustrated in FIG. 1d.

Electrodes 28, it will be appreciated, are spaced along substantially the entire length of plate 26 but are only illustrated individually in the drawings at the ends of plate 26 for purposes of clarity. The notched charge electrode plate typically is formed of an electrically non-conductive material which has been notched along one edge, the notches coated with conductive material to form electrodes 28, and printed circuit conductors added to the lower surface of the plate 26. The printed circuit conductors are electrically connected by a connector cable to charge electrode driver circuitry which provides the appropriate electrical charge potentials under control of a computer or other image data source.

Figure 1B:
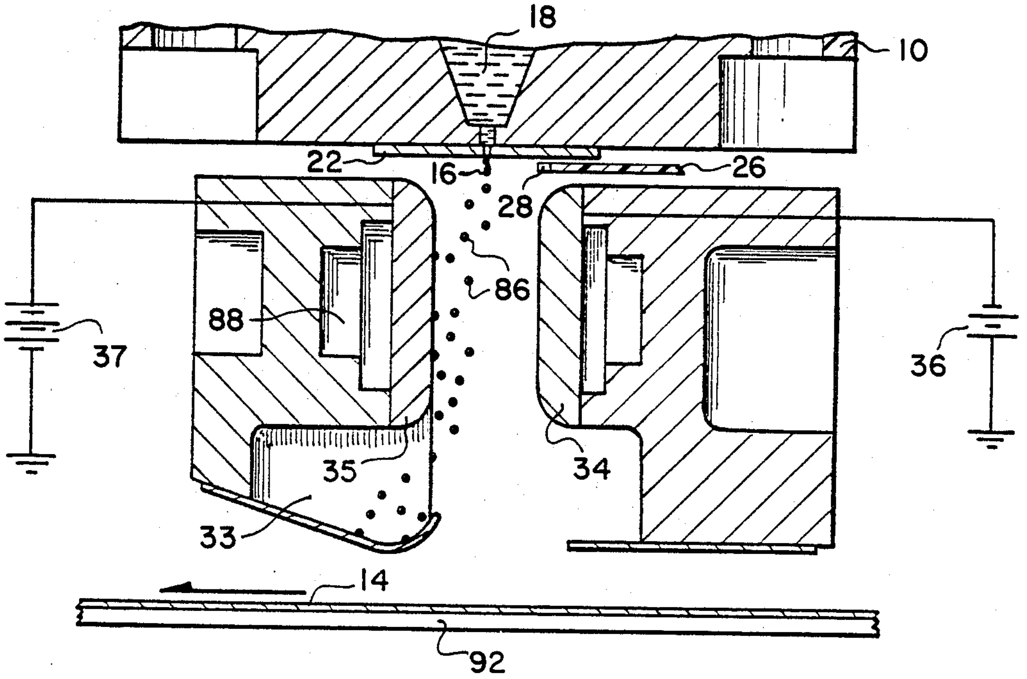
Figure 1C:
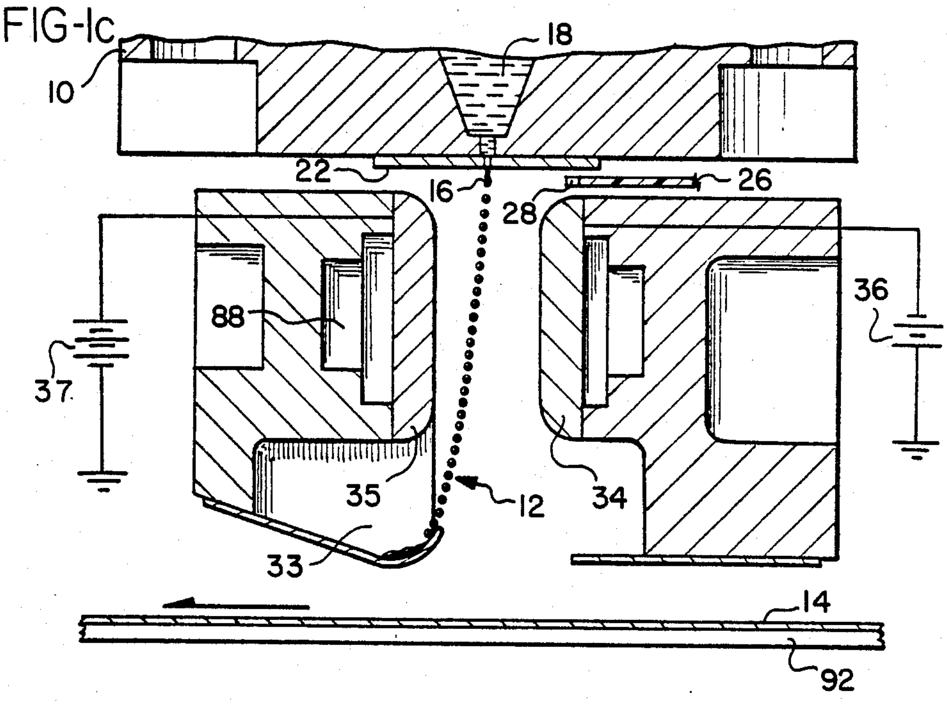
Figure 1D:
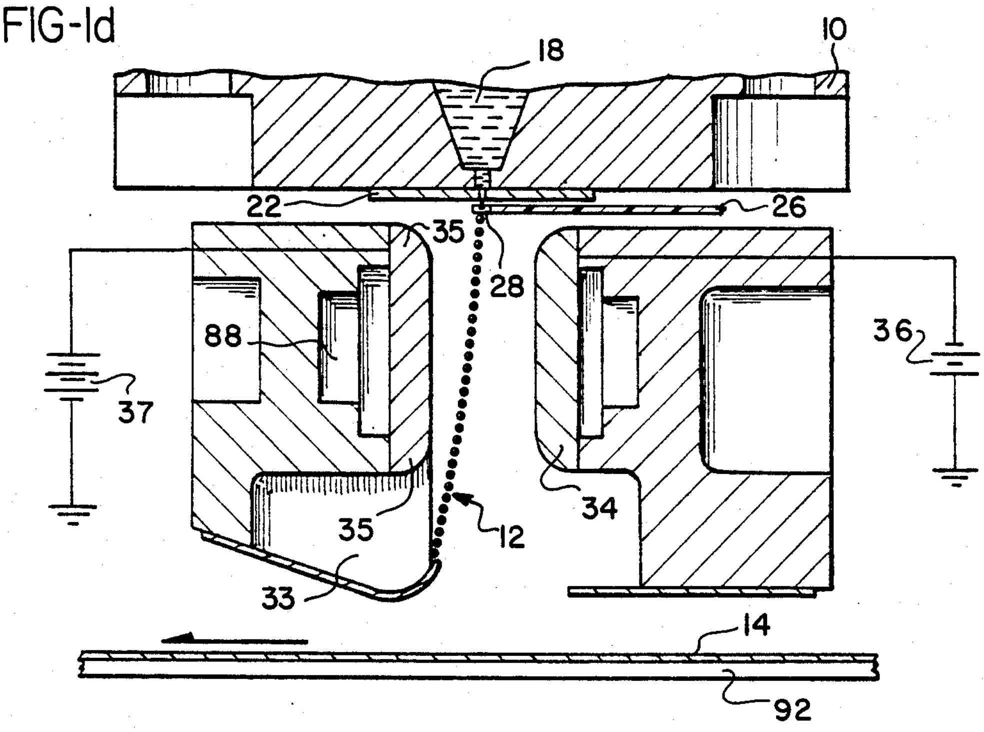
Figure 4:
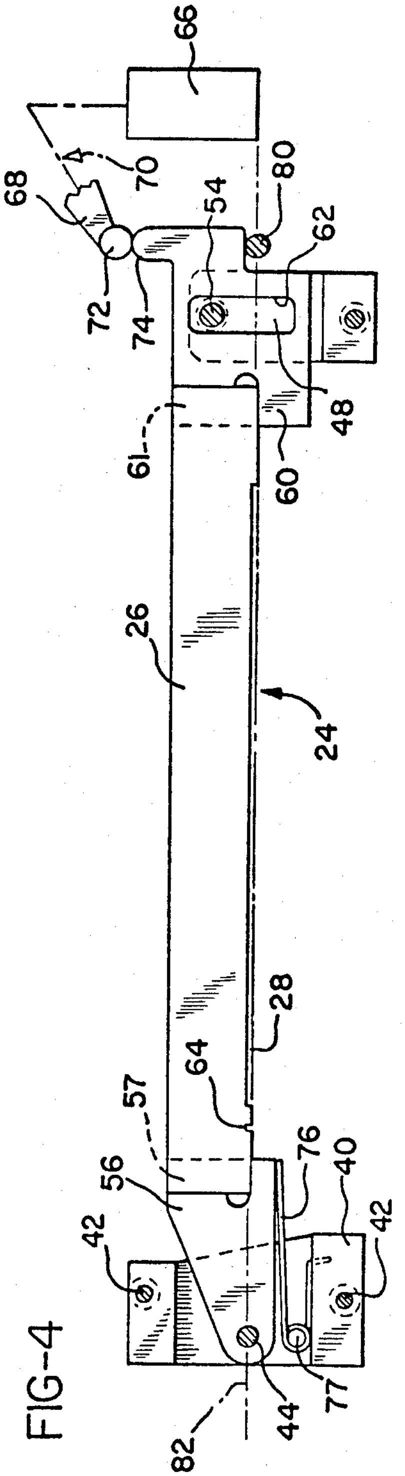
FIG. 4, a plan view of the charge electrode arrangement as seen looking downward from the print head, illustrates the charge electrode arrangement in its first, operating position.
Figure 5:
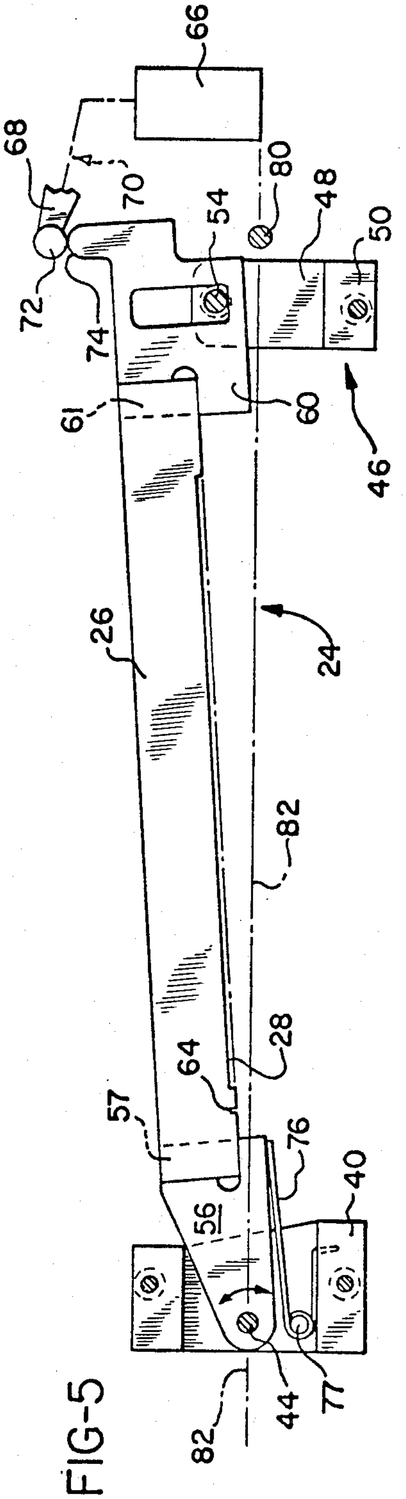
FIG. 5, a view similar to FIG. 4, illustrates the charge electrode arrangement in its second, retracted position.

The charge electrode means 24 is movable between a first operating position, shown in FIGS. 1d and 4, in which the electrodes partially surround the fluid filaments 16, and a second retracted position, shown in FIGS. 1*a* and 5, in which the charge electrode means 24 is remote from the fluid filaments.

The printer further includes catcher means 33 which is positioned to one side of the paths of the jet drop stream or streams produced by the print head means 10, for catching drops deflected thereto. A deflection field means, including first and second deflection electrodes 34 and 35, respectively, and potential sources 36 and 37 produces an electrical deflection field in the region between the print head means 10 and the catcher means 33. The field extends in a direction such that drops carrying a charge of a first polarity are deflected toward the catcher means. The field has a non-zero potential of a second polarity in the region of the fluid filaments 16. A partial vacuum is supplied to the area above catcher 33 such that drops caught by the catcher are carried away.

Figure 3:
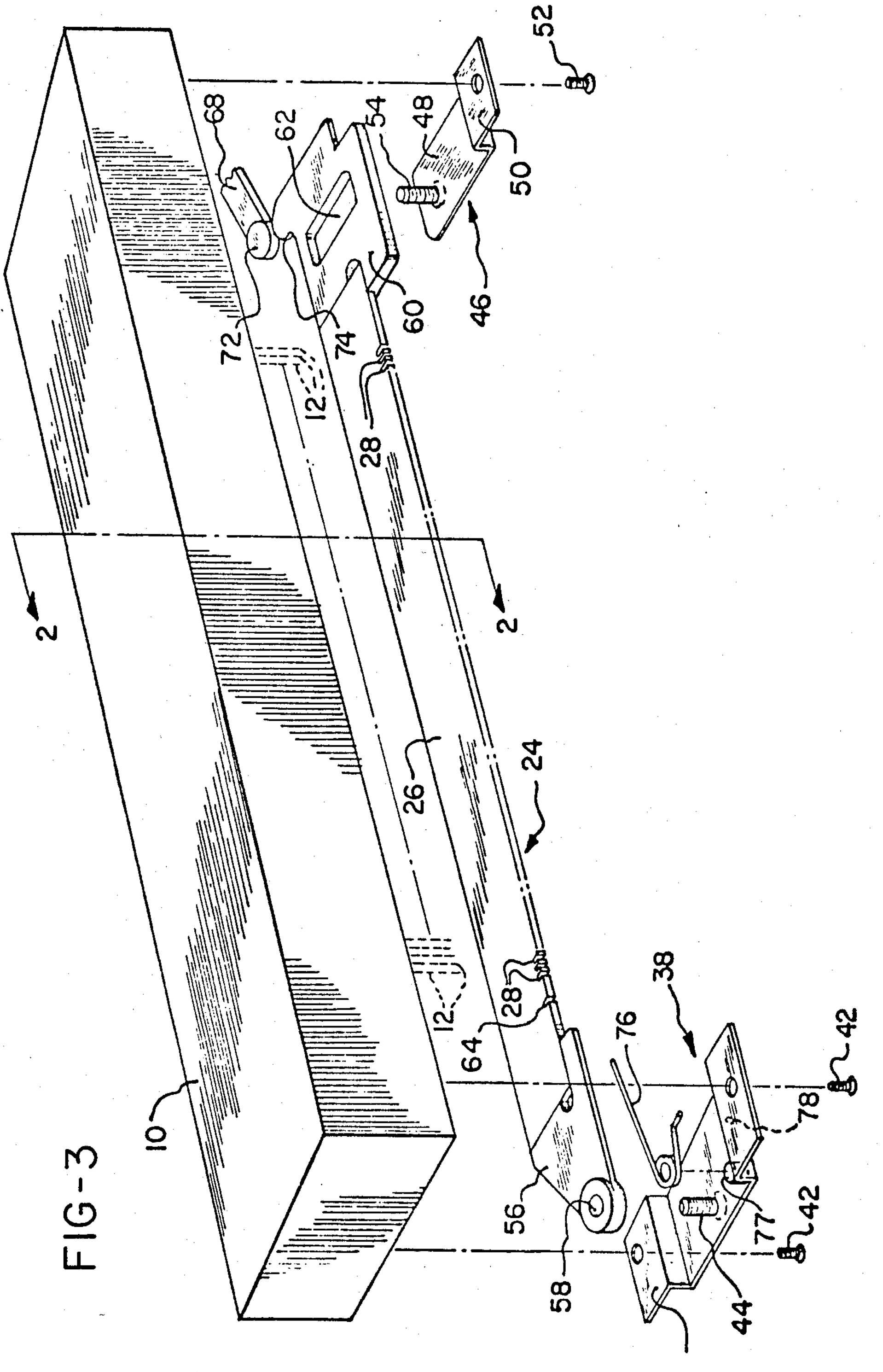
FIG. 3 is an exploded perspective view illustrating the print head, charge electrode arrangement, and means for moving the charge electrode arrangement, according to the present invention.

A means is provided for moving the charge electrode means 24 from the second position to the first position after start-up of the printer and stabilization of the jet drop streams, and for moving the charge electrode means from the first position to the second position prior to shutdown of the printer, whereby drops in the jet drop stream are charged by the deflection field and deflected to the catcher at start-up and shutdown of the printer. The means for moving the charge electrode means is illustrated in FIGS. 3–5. By retracting the charge electrode plate 26 during the periods of jet drop stream instability, wetting of the charge electrodes 28 by unusually large drops or drops having an unexpected trajectory is prevented. As a consequence, the damage which has occurred in prior art printers due to shorting of the charge electrodes with electrically conductive ink is avoided.

A mounting means is provided for pivotally supporting charging means 24 to permit the charge electrode plate 26 to be pivoted about an axis which is parallel to each of the streams and in line with the row of jet drop streams. The mounting means comprises pivot support 38 mounted to the print head means 10 at one end thereof. Support 38 includes a first bracket 40, attached to the print head by threaded screws 42, and a pivot shaft defined by screw 44. The screw 44 extending through an opening in bracket 40 and engaging print head 10, is generally parallel with the fluid filaments and is in line with the row of jet drop streams 12.

The mounting means further includes bracket 46, defining a support surface 48. Bracket 46 is mounted to the print head 10 at a second end thereof, opposite the end to which bracket 40 is attached. The bracket 46 supports the opposite end of the charge electrode means 24 and permits it to slide over the support surface 48 as the charge electrode plate 26 is pivoted. The bracket 46 at its end 50 is attached to print head means 10 by a screw 52; also, bolt 54 extends through bracket 46 and engages the print head 10. Bolt 54 acts as a stop to contact the charge electrode means as the charge electrode plate 26 is pivoted into its second position, as illustrated in FIG. 5.

The charge electrode means includes a first end member 56 attached to the charge electrode plate 26 at a first end thereof. Plate 26 is received within a recess 57 defined by member 56. Member 56 further defines a pivot opening 58 which engages the pivot shaft defined by bolt 44. The charge electrode means further includes a second end member 60 which is attached to the charge electrode plate 26 at a second end thereof. Charge electrode plate 26 is received within a recess 61 defined by member 60. Member 60 further defines an opening 62 engaging the bolt 54. Typically, the first and second end members 56 and 60 are adhesively bonded to charge electrode plate 26.

It will be appreciated that the relative position between the end members 56 and 60 and the charge electrode plate 26 at the time that members 56 and 60 are bonded to the charge electrode plate 26 is critical in assuring that the charge electrode notches 28 are properly positioned during operation of the printer. Toward this end, a reference notch 64 is provided along the edge of plate 26. Notch 64 is precisely positioned with respect to the first of the electrode notches 28. As a consequence, when the members 56 and 60 and plate 26 are assembled in a jig prior to adhesive bonding, positioning of the plate 26 such that notch 64 is a specified distance from the center of opening 58 results in the notches 28 being positioned a proper distance from the center of opening 58.

The printer further includes means for moving the charge electrode means 24 from its second position (FIG. 5) to its first position (FIG. 4) after start-up of the printer and initiation of the jet drop streams, and for moving the charge electrode means 24 from its first position to its second position prior to shutdown of the printer. This arrangement includes a pneumatic actuator 66 which is linked to lever arm 68, which arm pivots about pivot point 70. Lever arm 68 defines a cylindrical end portion 72 which contacts the curved surface 74 of member 60. The actuator means applies an actuation force to the second end member 60 which tends to move the charge electrode plate 26 into its first position.

In opposition to this actuation force, a spring 76 mounted on boss 77, having one end engaging member 56 and the other end extending through opening 78 in bracket 40, applies a spring force to member 56 tending to move the charge means 24 into its retracted position. When in its first position, shown in FIG. 4, the member 60 strikes a stop 80 which preferably may be a bolt extending downward from the bottom of print head 10. The axis of rotation of the charge electrode means is coincident with the center of bolt 44 and is parallel with the jet drop streams 12. Further, the axis of rotation is aligned with the row of streams, which streams are positioned generally along a line 82. As a consequence, movement of the charge electrodes 28 is substantially perpendicular to the row 82 when the charge electrode means 24 is near its first position.

FIGS. 1*a*–1*d* illustrate the method which the first embodiment of the ink jet printer of the present invention operates. First and second deflection electrodes 33 and 34, respectively, are positioned symmetrically with respect to orifices 20 and the jet drop streams which will ultimately be produced by the flow of fluid from reservoir 18 through the orifices. Potential source 36 applies an electrical potential of a first, negative polarity to the first deflection electrode 34. Potential source 37 applies a second electrical potential of a second, positive polarity to the second electrode 35, such that the absolute value of the electrical potential supplied to electrode 34 is less than the absolute value of the electrical potential supplied to deflection electrode 35. As a consequence, the electrical field potential level along line 84, which includes the region adjacent orifice 20, is non-zero and of a second, positive polarity.

At start-up of the print head, the potentials are applied to deflection electrodes 34 and 35 by their associated voltage sources and the deflection field established. Next, fluid is applied to reservoir 18 of print head 10 under pressure and emerges from the orifices 20 as fluid filaments 16. Fluid filaments 16 breakup into drops 86 of somewhat irregular size and spacing, as shown in FIG. 1*b*. As may be noted, the charge plate 26 is held in its retracted position at this time such that the deflection field is not shielded by electrodes 28. The drops 86 formed from the fluid filament 16, therefore, receive induced negative charge which result in these drops being attracted to the deflection electrode 35 although their trajectories vary somewhat and are unpredictable. The charged drops are either caught by catcher 33 or impinge upon the deflection electrode 35 which is formed of a porous material. A vacuum cavity 88 behind electrode 35 receives a partial vacuum, whereby drops striking the deflection electrode 35 are ingested into the cavity 88 and carried away through the partial vacuum supply line (not shown). By this technique, the drops produced at start-up of the print head are caught and do not soil the print receiving medium 14 or the medium transport 92 which carries the medium 14 past the ink jet printer during printing operations. Additionally, the charge electrodes 28 are positioned remote from the jet drop streams 12 and are not wetted by the drops of ink which are formed in an unstable fashion. Short out of the electrodes is thereby avoided.

After the pressure in the fluid receiving reservoir 18 reaches normal operating pressure levels and after the operation of a stimulator which couples plane waves into reservoir 18 is stabilized, the breakup of the jet drop streams becomes uniform and drops of constant size and spacing are produced, as shown in FIG. 1*c*. All of these drops are charged by the deflection field from electrodes 34 and 35, which field has a non-zero potential level in the region of drop formation, that is adjacent the end of the fluid filament 16.

As the final step in start-up, the charge electrode plate 26 is moved from its second position into its first position, shown in FIG. 1*d*. As the charge electrodes 28 surround the fluid filaments, the electrically conductive electrodes shield the filaments from the deflection field. A positive charge potential is, however, applied to all of the electrodes 28 during movement of the charge electrode plate into the position shown in FIG. 1*d*. As a consequence, the drops continue to receive a negative electrical charge and continue to be deflected to the catcher 33. Charging signals may now be selectively applied to the charge electrodes 28 such that selected ones of the drops are deflected to the catcher 33, whereas others of the drops are not deflected or are deflected by a lesser amount so as to strike the print receiving medium 14 at the desired locations. At shutdown of the printer, the sequence of steps described above is simply reversed to ensure that the unstable jet drop streams are caught.

Figure 2A:
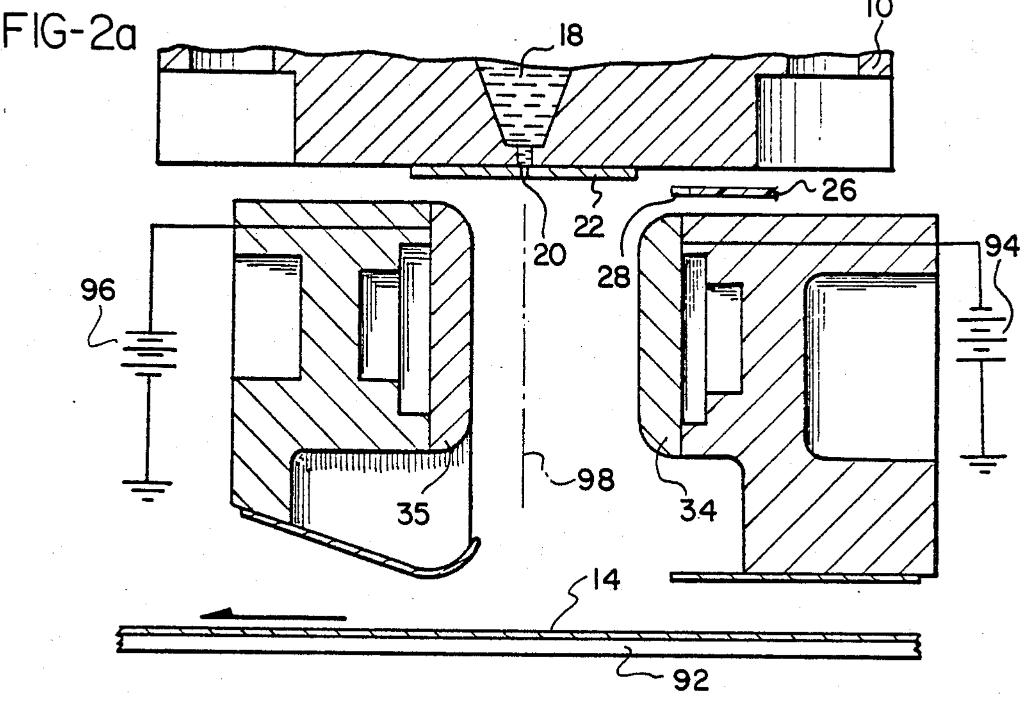
FIGS. 2a–2d are sectional views, similar to FIGS. 1a–1d, respectively, illustrating start-up of a second embodiment of the ink jet printer of the present invention.
Figure 2B:
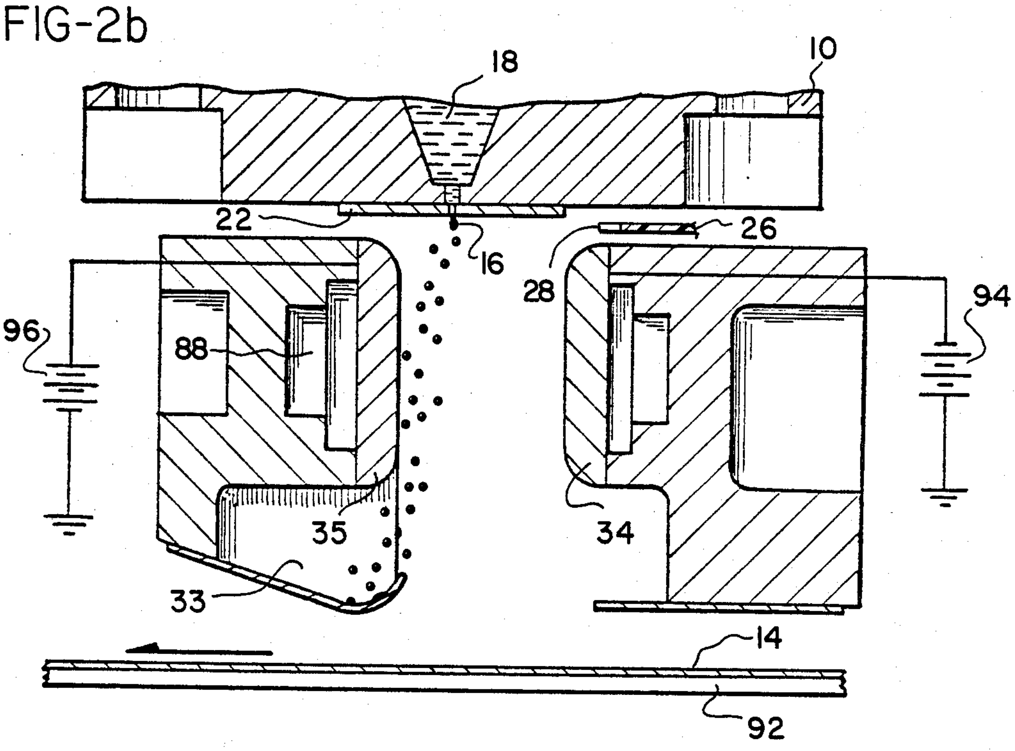
Figure 2C:
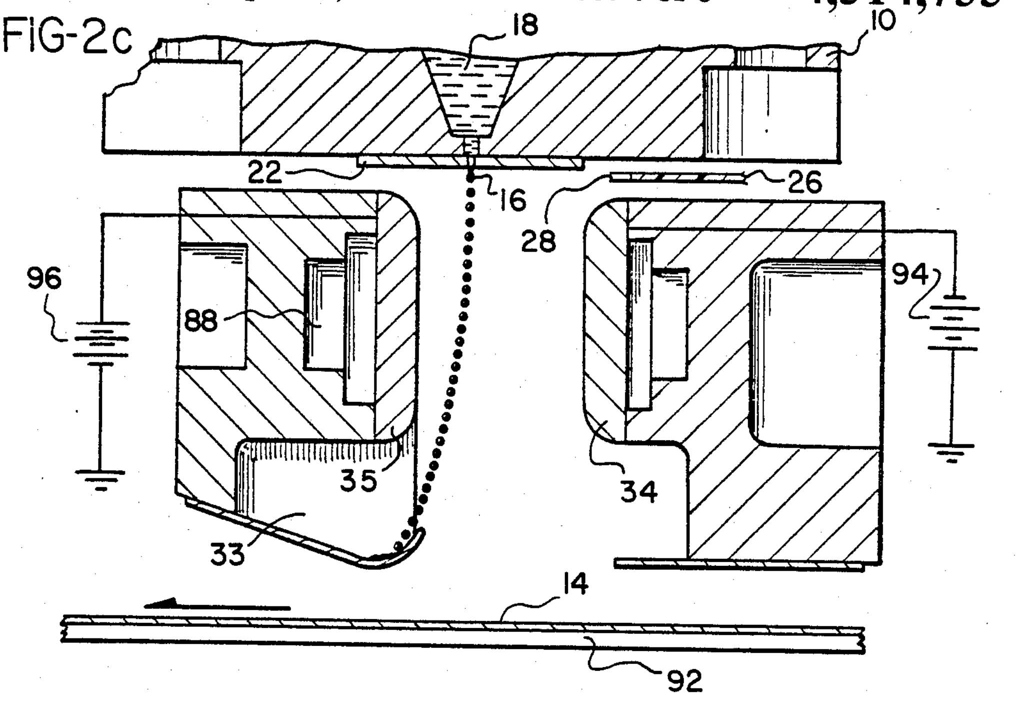
Figure 2D:
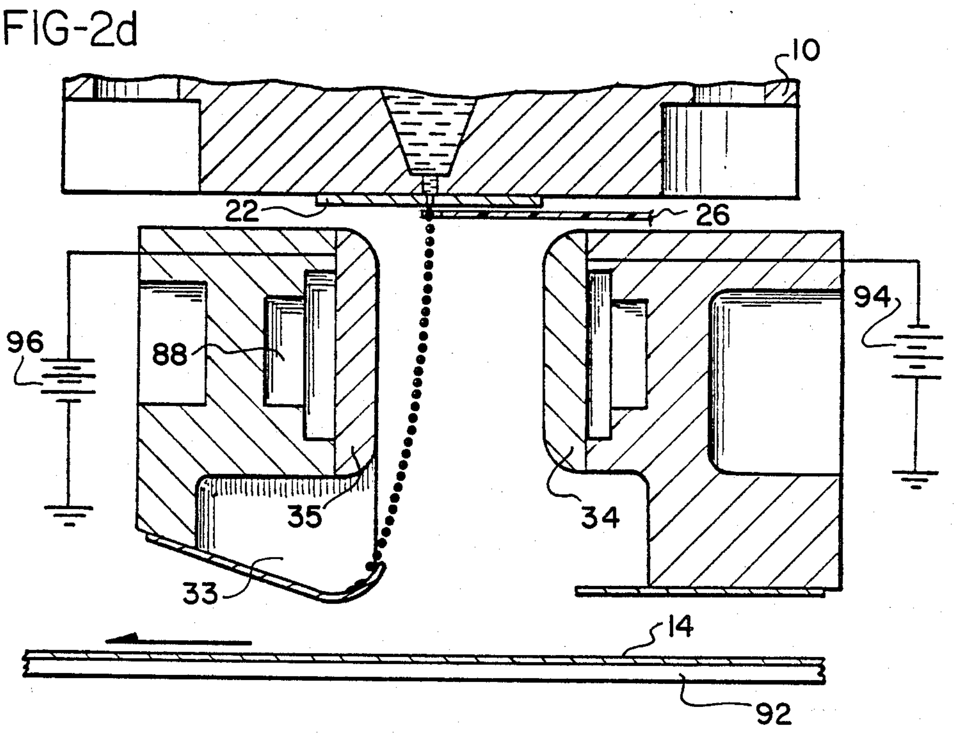

FIGS. 2*a*–2*d* illustrate a second embodiment of the ink jet printer of the present invention. In these drawings, elements corresponding to those of the printer shown in FIGS. 1*a*–1*d* are labeled with corresponding numerals. In this embodiment, deflection electrodes 34 and 35 are positioned on opposite sides of the jet drop streams, with the second electrode 35 being positioned substantially closer to the jet drop streams than the first deflection electrode 34. The voltage source 94 supplies a first electrical potential to the first deflection electrode 34, and the voltage source 96 supplies a second electrical potential of a positive polarity to the deflection electrode 35. The potential levels of sources 94 and 96 are substantially equal in magnitude. As a result of the non-symmetrical positioning of the electrodes 34 and 35, however, the deflection field between the electrodes is such that a non-zero field potential of a second positive polarity is provided along the line 98. Thus, the field has a non-zero potential of a positive polarity in the region of the fluid filament 16 and, as a consequence, the drops formed at start-up of the print head are deflected to the electrode 35 and catcher 33, as illustrated in FIG. 2*b*.

The sequence by which start-up of the printer is accomplished is precisely the same as that discussed above with respect to the first embodiment of the invention shown in FIGS. 1*a*–1*d*. Initial charging of the drops is accomplished by the deflection field, with the charge electrode plate being retracted from its normal operating position. The charge electrodes are therefore not contaminated by the unstable jet drop streams. After drop breakup is stabilized and becomes uniform, the charge plate 26 is pivoted inward and charging is accomplished by means of the charge electrodes 28. Similarly, shutdown of the printer is accomplished according to the same sequence of steps described above in respect to the first embodiment of the invention.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An ink jet printer, comprising:

print head means for producing at least one jet drop stream from a fluid filament emerging therefrom, charge electrode means for inducing electrical charges on drops formed from said fluid filament when said charge electrode means is in a first position at least partially surrounding said filament, said charge electrode means being movable into a second position remote from said fluid filament, catcher means, positioned to one side of the path of said jet drop stream, for catching drops deflected thereto, deflection field means for producing an electrical deflection field in the region between said print head means and said catcher means, said field extending in a direction such that drops carrying a charge of a first polarity are deflected toward said catcher means, and said field having a non-zero potential of a second polarity in the region of said fluid filament, and means for moving said charge electrode means from said second position to said first position after start-up of said printer and initiation of said jet drop stream, and for moving said charge electrode means from said first position to said second position prior to shutdown of said printer, whereby drops in said jet drop stream are charged by said deflection field and deflected to said catcher means at start-up and shutdown of said printer.

2. The ink jet printer of claim 1 in which said deflection field means comprises:

first and second deflection electrodes positioned symmetrically with respect to said jet drop stream and means for applying an electrical potential of a first polarity to said first deflection electrode and for applying a second electrical potential of a second polarity to said second electrode, the absolute value of said electrical potential of a first polarity being less than the absolute value of said electrical potential of a second polarity, such that said field has a non-zero potential of a second polarity in the region of said fluid filament and drops are charged by said field when said charge electrode means is positioned in said second position remote from said fluid filament.

3. The ink jet printer of claim 2 in which said second deflection electrode is positioned on the same side of said jet drop stream as said catcher means.

4. The ink jet printer of claim 2 in which said second deflection electrode is formed of a porous material and defines a vacuum cavity to which a partial vacuum is applied, whereby drops striking said second deflection electrode are ingested into said vacuum cavity.

5. The ink jet printer of claim 1, in which said deflection field means comprises:

first and second deflection electrodes positioned on opposite sides of said jet drop stream, said second electrode being substantially closer to said jet drop stream than said first deflection electrode, and means for applying first and second electrical potentials of first and second polarities to said first and second deflection electrodes, respectively, said first and second electrical potentials being of substantially equal magnitude, such that said field has a non-zero potential of a second polarity in the region of said fluid filament and drops are charged by said field when said charge electrode means is in said second position, remote from said fluid filament.

6. The ink jet printer of claim 1 in which said print head means produces a plurality of jet drop streams arranged in at least one row, and in which said charge electrode means includes a charge plate defining a plurality of open-sided charge electrodes along one edge of said charge plate.

7. In an ink jet printer including a print head for producing at least one jet drop stream, charge electrode means for inducing electrical charges on the drops formed in said jet drop stream, a catcher positioned to one side of the jet drop stream for catching drops deflected thereto, and deflection field means for producing an electrical deflection field in the region between said print head and said catcher, said field extending in a direction such that drops carrying a charge of a first polarity are deflected toward said catcher means, the method of printer start-up, comprising the steps of:

retracting said charge electrode means from its normal operating position, producing an electrical deflection field having a non-zero potential of a second polarity in the region adjacent said print head, initiating jet drop stream formation, whereby the drops formed are electrically charged to a first polarity by said electrical deflection field and subsequently deflected to said catcher, and moving said charge electrode means into its normal operating position so as to shield said jet drop stream in the region of drop formation, while continuing to charge said drops to a first polarity with said charge electrode means so as to catch said drops.

8. The method of claim 7 in which the step of producing an electrical deflection field includes the steps of:

providing first and second deflection electrodes positioned symmetrically to either side of said jet drop stream, and applying an electrical potential of a first polarity to said first electrode and an electrical potential of a second polarity to said second electrode, said electrical potential of a second polarity having an absolute magnitude greater than the absolute magnitude of said electrical potential of a first polarity, whereby the potential of said field in the region where drops are formed is non-zero and of a second polarity to thereby induce a charge of a first polarity on the drops.

9. The method of claim 7 in which the step of producing an electrical deflection field includes the steps of:

providing first and second deflection electrodes positioned to either side of said jet drop stream, said second deflection electrode being closer to said jet drop stream than said first electrode, and applying an electrical potential of a first polarity to said first deflection electrode and an electrical potential of a second polarity to said second deflection electrode, said potentials applied to said deflection electrodes being of substantially equal magnitude.

10. The method of claim 7 in which the step of moving said charge electrode means into its normal operating position includes the step of providing an electrical field potential of a second polarity in the region of drop formation with said charge electrode means so that drops continue to be charged to said first polarity and drops continue to be deflected to said catcher.

11. In an ink jet printer including a print head for producing at least one jet drop stream, charge electrode means for inducing electrical charges on the drops formed in said jet drop stream, a catcher positioned to one side of the jet drop stream for catching drops deflected thereto, and deflection field means for producing an electrical deflection field in the region between said print head and said catcher, said field extending in a direction such that drops carrying a charge of a first polarity are deflected toward said catcher means, the method of printer shutdown, comprising:

producing an electrical deflection field having a non-zero potential in the region adjacent said print head, while shielding the jet drop stream with said charge electrode means in the region of drop formation from said deflection field, charging drops formed in said jet drop stream to a charge level of said first polarity by said charge electrode means, retracting said charge electrode means from its normal operating position to expose the drops then being formed to said electrical deflection field, whereby said drops are charged to a charge of a first polarity by said electrical deflection field and therefore are deflected to said catcher, and terminating jet drop stream formation.

12. The method of claim 11 in which the step of producing an electrical deflection field includes the steps of:

providing first and second deflection electrodes positioned symmetrically to either side of said jet drop stream, and applying an electrical potential of a first polarity to said first electrode and an electrical potential of a second polarity to said second electrode, said electrical potential of a second polarity having an absolute magnitude greater than the absolute magnitude of said electrical potential of a first polarity, whereby the potential of said field in the region where drops are formed is non-zero and of a second polarity, thereby to induce a charge of a first polarity on the drops.

13. The method of claim 11 in which the step of producing an electrical deflection field includes the steps of:

providing first and second deflection electrodes positioned to either side of said jet drop stream, said second deflection electrode being closer to said jet drop stream than said first deflection electrode, and applying an electrical potential of a first polarity to said first deflection electrode and an electrical potential of a second polarity to said second deflection electrode, said potentials applied to said deflection electrodes being of substantially equal magnitude.

14. The method of claim 11 in which the step of charging drops by said charge electrode means includes the step of providing an electrical field potential of a second polarity in the region of drop formation.

* * * * *